Figure 1:
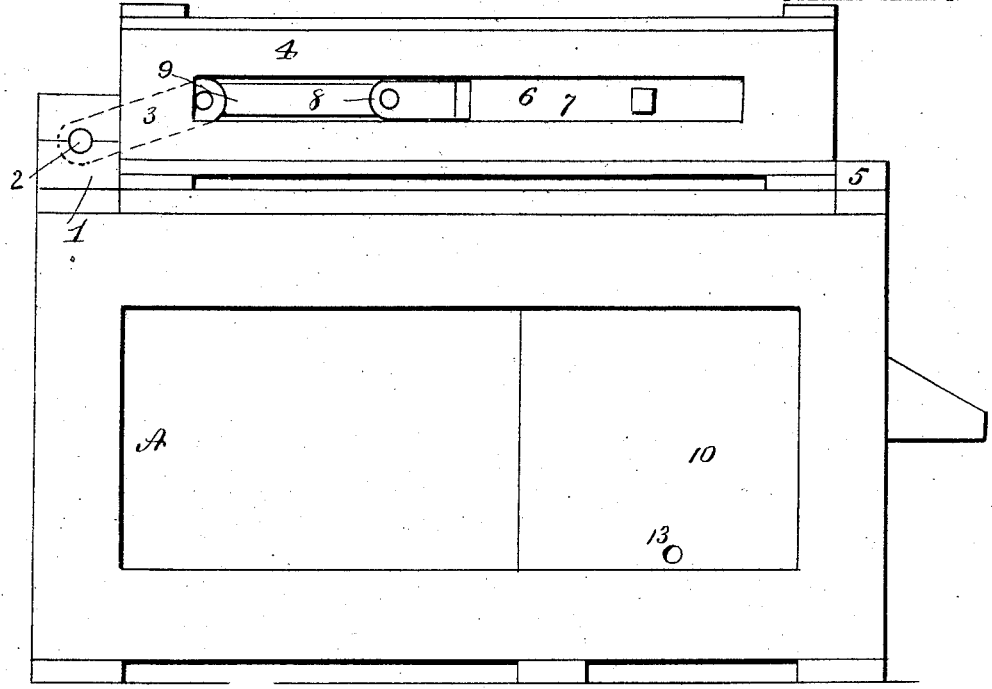

No. 873,897. PATENTED DEC. 17, 1907.
G. ROSENBERRY.
MACHINE FOR WELDING COPPER.
APPLICATION FILED NOV. 28, 1906.

2 SHEETS—SHEET 1.

Witnesses
F. L. Ourand
N. P. Lawson

Inventor
George Rosenberry
By Frank S. Appleman
Attorney

No. 873,897. PATENTED DEC. 17, 1907.
G. ROSENBERRY.
MACHINE FOR WELDING COPPER.
APPLICATION FILED NOV. 28, 1906.
2 SHEETS—SHEET 2.
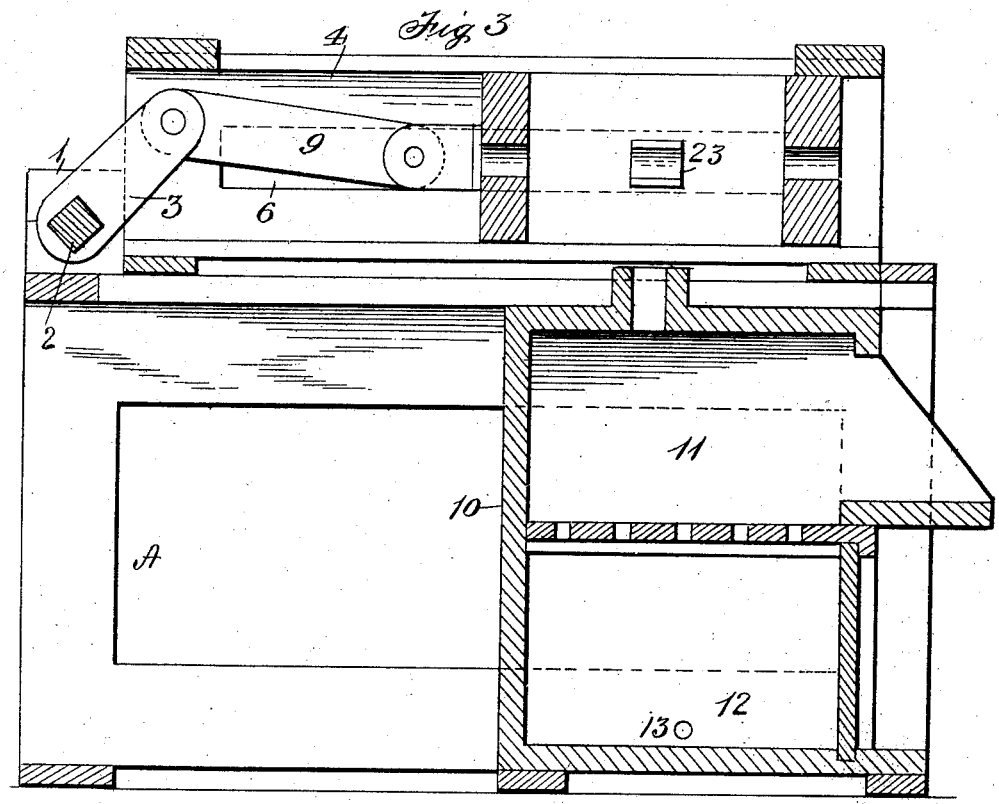
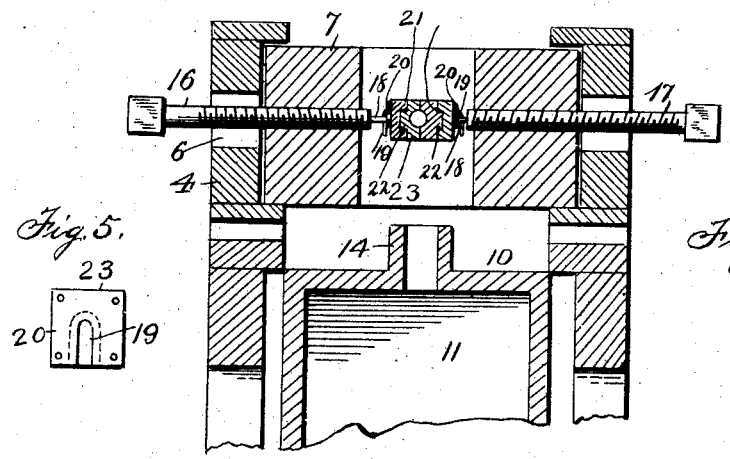
Witnesses
F. L. Orwand
W. P. Lawson
Inventor
George Rosenberry
By Frank A. Appleman
Attorney.

UNITED STATES PATENT OFFICE.

GEORGE ROSENBERRY, OF HARRISBURG, PENNSYLVANIA, ASSIGNOR OF ONE-HALF TO JESSE B. KENNEDY, OF STEWARTSTOWN, PENNSYLVANIA.

MACHINE FOR WELDING COPPER.

No. 873,897.   Specification of Letters Patent.   Patented Dec. 17, 1907.

Application filed November 28, 1906. Serial No. 345,421.

*To all whom it may concern:*

Be it known that I, GEORGE ROSENBERRY, a citizen of the United States of America, residing at Harrisburg, in the county of Dauphin and State of Pennsylvania, have invented certain new and useful Improvements in Machines for Welding Copper, of which the following is a specification.

This invention relates to new and useful improvements in welding machines and is intended more especially to be used in welding copper.

It is an object of this invention to provide a novel device wherein the welding is effected by continual pressure in lieu of the well known practice of hammer strokes.

It is furthermore, an object of this invention to provide novel means in a device of this kind wherein the vise employed in the operation of the invention may be adjusted with relation to the welding medium.

It is also an object of the invention to provide novel means for operating the hammers employed in the device.

Finally an object of this invention is to produce a device of the character noted, which will possess advantages in points of simplicity, efficiency and durability, proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 2:
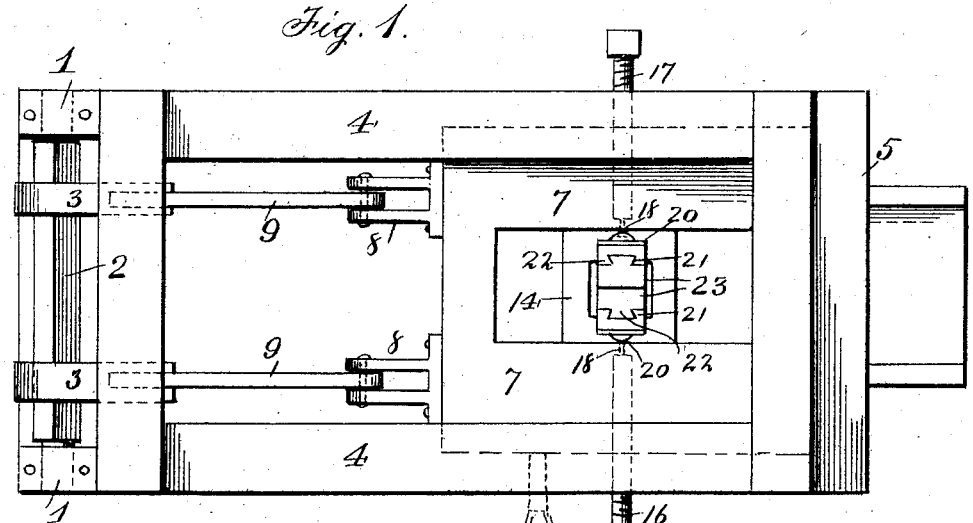

Figure 1, is a side elevation of the invention. Fig. 2, is a view in top elevation. Fig. 3, is a longitudinal sectional view of Fig. 1. Fig. 4, is an enlarged sectional view. Fig. 5, is a detail view in elevation.

In the drawings A, denotes a frame made of any suitable material and of any desired size but it has been found in practice most advantageous to construct the same of cast metal. To one end of the frame are arranged along the opposite sides thereof, bearings 1, in which is mounted a shaft 2, provided with cranks 3, for a purpose to be hereinafter more fully explained. These bearings also form an abutment for a vise rack 4. The opposite end of said rack contacts with a cross piece 5, on the frame. The bearings 1, and this cross strip 5, hold the vise rack against displacement. The rack 4, is provided with slotted runways 6, in which the vise 7, is adapted to travel. Projecting from an end of the vice are parallel lugs 8, between which are pivoted ends of links 9, the opposite ends of the links being pivotally secured to the cranks 3, on the shaft 2. By this arrangement, the vise can be moved within the vise rack upon the rotation of the shaft. This movement is intended in order that the material held by the vise to be welded may be carried above or away from the welding medium arranged within the frame A.

Although it is to be understood that any welding medium can be employed a furnace is illustrated in the drawings, said furnace comprising in its construction a body 10, having a fire box 11, an ash pit 12, and a bellows 13, arranged to one side of the furnace. This furnace is provided at its top with a heating chimney 14, which is intended to direct the heat in contact with the metal to be welded.

Extending through the slots of the vise rack and threaded through the sides of the vice proper, are oppositely opposed screw rods 16, 17, which are provided on their ends with extensions 18, adapted to be engaged by removable sockets 19. The sockets are provided on their rear portion with a slotted plate 20, adapted to engage the extensions of the faces. The outer face of each of the sockets is provided with dovetail vertical grooves 21, adapted to be engaged by a similar tongue 22, formed on the rear surface of a face 23. The front portion of the face is curved to conform to the contour of the metal to be welded.

In welding the parts to be welded are heated a little over cherry red. The ends to be welded are then dipped in a suitable solution. The parts are then placed over a fire and left until they reach what is known as a goldish sweat. When it reaches this stage, the metal is ready to be welded. The parts to be welded are immediately placed in the vise or hammer part of the machine and pressed together by the operation of the lever on the left hand side of the machine. When the two ends adhere to each other through the operation of the vise, the metal is removed and again dipped in the solution and allowed to remain there about five minutes. When removed from the solution, it will be found to be completely welded. The parts welded are then finished off by filing or any other method used for such purposes.

The purpose of having the faces removable is to permit hammers of varying sizes and shapes to be employed in order to conform to the various shapes of the metal to be operated upon.

Having fully described my invention what I claim as new and desire to secure by Letters Patent, is—

In a welding machine, the combination of a main frame having a runway and having its sides slotted, a vise frame slidably mounted on the runway of the main frame, oppositely arranged rods threaded through the vise frame and passing through the slots of the main frame and faces carried by the opposing ends of the rods.

In testimony whereof, I affix my signature in the presence of two witnesses.

GEORGE ROSENBERRY, [L. S.]

Witnesses:
 WILLIAM E. SELBY,
 GEORGE H. GROVE.